March 16, 1943. G. B. HANSON 2,313,939
METHOD AND APPARATUS FOR ELECTRICALLY TREATING OILS
Filed June 17, 1938
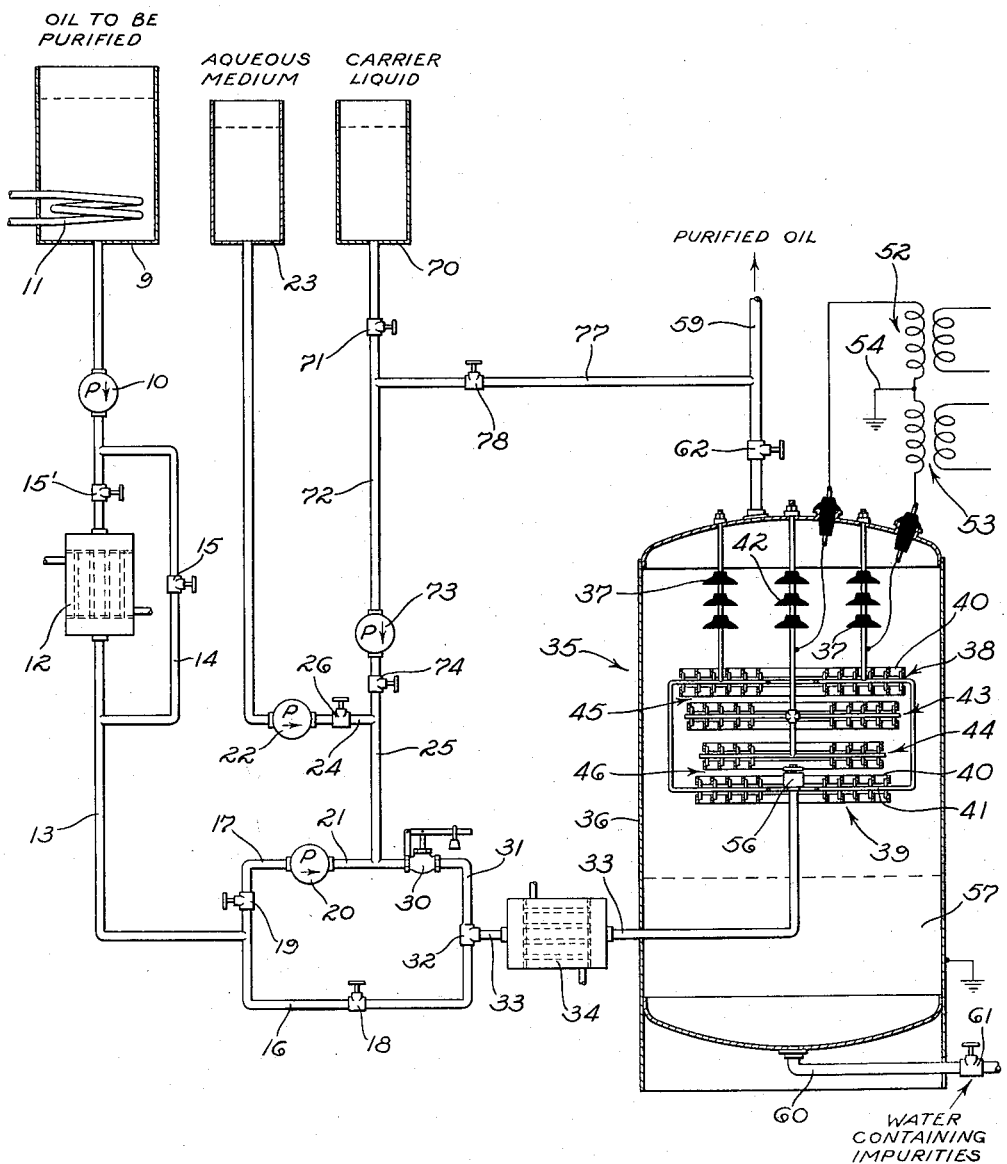
INVENTOR
GORDON B. HANSON
BY HARRIS, KIECH, FOSTER & HARRIS
FOR THE FIRM
ATTORNEYS.

Patented Mar. 16, 1943

2,313,939

UNITED STATES PATENT OFFICE 2,313,939

METHOD AND APPARATUS FOR ELECTRICALLY TREATING OILS

Gordon B. Hanson, Houston, Tex., assignor, by mesne assignments, to Petrolite Corporation, Ltd., Wilmington, Del., a corporation of Delaware Application June 17, 1938, Serial No. 214,377

15 Claims. (Cl. 204—190)

My invention relates to an electrical process and apparatus for the removal from an oil of various impurities which are associated with water droplets dispersed therein. It is particularly well adapted to the purification of petroleum oil which contains a small percentage of dispersed water, for example, oil resulting from the subjection of a crude oil emulsion to a dehydrating step. The invention is not primarily a dehydration process and can well start where such processes end. In effect, it replaces a substantial portion of the original impurity-containing droplets present in the oil to be treated with aqueous droplets of another type or chemical composition.

The impurities can be associated with the original water droplets in various ways. For example, they can be dissolved therein, dispersed therein, or held by adsorption thereto. For instance, the present process is well adapted to the removal of water-soluble salts, such as calcium chloride, magnesium chloride, sodium chloride, etc., dissolved in the original droplets, the invention being also applicable to the removal of inorganic acids or bases dissolved in such water droplets and to the removal of solid particles associated with the water by being dispersed therein or otherwise carried thereby, for example, silica, sand, silt, salt crystals, particles of iron, etc.

It is a primary object of the present invention to provide a novel method and apparatus for removing in large measure these original water droplets to the end that the oil will be purified by the consequent removal of the water-associated impurities.

The principle of the invention involves the dispersion in the oil to be treated of additional aqueous droplets which are relatively more free of the impurities than are the original water droplets. It is an object of this invention to provide a novel process and apparatus whereby the added aqueous droplets can be dispersed in the oil with a minimum of coalescence with the original droplets to produce a resulting or composite mixture which is then subjected to the action of an electric field while the original water droplets and the added aqueous droplets coexist. The powerful coalescing action of such an electric field coalesces the original droplets and the aqueous droplets and forms coalesced masses which can be readily separated from the oil, and which carry in large measure the impurities associated with the original water droplets.

It is an object of the present invention to provide a novel process and apparatus for forming such a resulting or composite mixture and which results in various economies, better electric treatment, and generally improved operation of the process.

In accomplishing this result, I add to the oil to be treated an auxiliary mixture comprising a carrier liquid which is of a character to blend with the oil and to which carrier liquid has been mixed the aqueous material which is to appear in the resulting or composite mixture adapted for electric treatment. The present invention comprises adding the desired aqueous material to such a carrier liquid to form a preliminary mixture and then blending this auxiliary mixture with the oil to be treated. This blending need involve only such gentle agitation as is desirable to uniformly blend the two materials. It is desired by this expedient to disperse the aqueous droplets into the oil to be treated so that they exist therein with the original water droplets. The particle size of the aqueous droplets can be controlled by the mixing action used in forming the auxiliary mixture, and the same is true as to controlling the relative number of original and aqueous droplets which are to appear in the resulting or composite mixture.

It is an object of the present invention to make and electrically treat a resulting or composite mixture formed by blending an auxiliary mixture into the oil to be treated by use of agitation which is preferably only sufficient to cause the resulting or composite mixture to be of relatively uniform character throughout, and particularly avoiding such disruptive agitation as might homogenize and greatly decrease the particle size of the aqueous droplets present in the auxiliary mixture.

The oil contemplated for treatment in the present invention may be any one of a number of oils which carry a small percentage by volume of dispersed water with which the impurities are associated. It may be a crude, refined, or semi-refined oil. The invention will be exemplified with reference to a petroleum oil and, more particularly, to a petroleum oil which contains droplets of brine. For example, it may be a topped oil or an oil obtained by dehydrating a crude oil emulsion by any well-known method. Such dehydration processes usually reduce the water content to a value not more than about 3% and, often, to a value below 1%. In many instances, the remaining water carries chemicals of such character and in such concentrations as to interfere seriously with subsequent distillation or cracking of the oil. For instance, the brine concentration of many Mid-Continent oils is such that, even if the water content is reduced to less than 1%, several hundred grams of salts per barrel of oil will be present in the remaining dispersed water droplets. The present invention gives best extractions of the impurities if used on oils containing not more than about 3% of dispersed water in the form of original droplets carrying the impurities. However, in some instances, the process is applicable to the purification of oils containing up to about 10% of water.

The carrier liquid contemplated for use in the present invention may be any liquid which is predominantly blendable with the oil to be treated. It is predominantly miscible with the oil and immiscible with the original water droplets and may be an oil fraction produced in the process of distillation, or may comprise other oil constituents. Its density may closely approximate that of the incoming oil to be treated or may differ widely therefrom. A carrier liquid having a density different from that of the oil to be treated is advantageous in certain instances. For example, when purifying a topped oil having a density so close to the aqueous medium as to make separation difficult, I may use as the carrier liquid a diluent or oil fraction which increases the gravity differential between the oil and the aqueous medium. The carrier liquid may be a liquid quite dissimilar to the oil to be treated in chemical nature, or it may be of a composition closely approximating or identical with that of the oil. The term "carrier liquid" as herein-used is not limited to a homogenous liquid entirely miscible with the oil for this carrier liquid may itself carry certain dispersed particles, for example water droplets, without impairing its utility in the present process. For example, it may comprise a portion of the cleaned or treated oil resulting from separation of the electrically treated constituents of the resulting or composite mixture. On the other hand, it may be a portion of the oil to be treated. In the latter instance, the incoming oil to be treated may be divided into two portions and the added aqueous material may be incorporated into one portion to form the auxiliary mixture which is then added to and blended into the remaining portion of the incoming oil.

The aqueous medium used in forming the auxiliary mixture can be selected from various sources. It should be relatively more free of the impurities to be removed than are the original impurity-containing droplets, for the process acts, in effect, to replace original droplets with droplets of the aqueous medium. In removing salty impurities from the oil, I prefer to use an aqueous material which is relatively free of such impurities. Fresh water derived from various sources can be used, for example, waters drawn from rivers, lakes, wells, etc., even though considerable minerals and salts may be present therein. It is not necessary to use distilled water in the process and various fresh waters will give entirely satisfactory results. However, on certain oils, improved treatability and a cleaner separation result by use of water which is somewhat alkaline. If desired, a small amount of alkali, such as caustic soda or other well-known alkaline reagents, can be incorporated into the fresh water to form the aqueous material used in the present process.

The invention will be described with particular reference to the removal of salty water from a dehydrated petroleum oil, but it will be clear that this description is merely exemplary of one application of the process which finds wide commercial utility. In the drawing, I have shown an apparatus particularly adapted to the continuous performance of the process herein set forth but it will be clear that semi-continuous or batch procedures can be used and that the process can be performed in structures other than the one shown. Certain features of the electric treating apparatus here shown are claimed in the copending application of Harold C. Eddy, Serial No. 218,681 which has matured into Patent Number 2,277,513, granted March 24, 1942.

Referring particularly to the drawing, the oil to be treated by the present process may comprise an oil resulting from the dehydration of a crude oil emulsion and may be retained in a storage tank 9. This oil may be continuously withdrawn by a pump 10 and may be heated in storage by a steam coil 11, or by a heater 12, discharging into a pipe 13. A pipe 14 is shown as by-passing the heater 12 when valve 15 is opened and valve 15' closed.

In the embodiment of the invention particularly illustrated, the stream of incoming oil moving through the pipe 13 is divided into a main stream which continues through a pipe 16, and an auxiliary stream which moves through a pipe 17. Valves 18 and 19 control the respective quantities in these streams. In this instance, the oil in the auxiliary stream comprises the carrier liquid and will be of the same character as the incoming oil moving through the pipe 13, and will thus contain some water in the form of droplets dispersed therein.

The invention contemplates the addition of an aqueous medium to this carrier liquid, in this instance the auxiliary stream, and blending of the auxiliary mixture thus formed with the main stream of the oil moving through the pipe 16. For this purpose, a pump 20 may intake from the pipe 17 and discharge this auxiliary stream into a pipe 21. The aqueous medium is introduced into this auxiliary stream by use of any suitable means. The embodiment shown includes a pump 22 withdrawing the aqueous medium from a tank 23 and discharging it through a pipe 24 into an intersecting pipe 25 which joins the pipe 21. The amount of aqueous medium thus introduced may be determined by the setting of a valve 26 in the pipe 24, or by proper control of the speed of the pump 22. If an alkaline aqueous medium is desired, the alkaline material may be introduced into the tank 23 or may be otherwise mixed with the aqueous medium, either continuously or in batches.

It is desirable to incorporate the aqueous medium into the carrier liquid (in this instance the auxiliary stream of the incoming oil) in such manner that droplets of the aqueous medium will be dispersed therein. This can be accomplished by various mixing expedients, though the degree of agitation desirable in forming this auxiliary mixture will vary with different oils and will depend partially upon the character of the particular carrier liquid utilized, as well as the composition of the aqueous medium. With a carrier liquid which emulsifies easily, a less intimate mixing action is desired than with a carrier liquid which does not so easily emulsify. It is sometimes sufficient merely to introduce the aqueous medium into the pipe 21 at right angles to the stream therein, possibly assisted by mixing devices at this point, known in the art. If desired, the mixing action of the pump 20 may be used in this regard by introducing the aqueous medium into the pipe 17. A preferred mixing device is indicated by the numeral 30 and comprises a valve or restriction disposed in the pipe 21 to receive and further mix the dispersion formed when the aqueous medium is introduced into the auxiliary stream of oil. Various forms of mixing devices suitable for use at this point are known, the embodiment illustrated being a weight-loaded valve which induces additional mixing of the water and the carrier liquid when these liquids move between the valve surfaces. By increasing the weight acting to close such a valve, it is possible to form auxiliary mixtures of increasing stability and decreasing particle size. If the weight acting to close such a valve is decreased, it is possible to form relatively unstable or loose mixtures with larger particles of the aqueous medium being dispersed in the carrier liquid.

The auxiliary mixture discharges from the mixing means 30 into a pipe 31 and is delivered to a blending means 32 with which the pipe 16 also communicates. Any suitable means may be used for blending the auxiliary mixture with the main stream of the oil, but it is usually sufficient merely to bring the two streams together, the incidental turbulence at this point, or at subsequent points, being sufficient to blend the carrier liquid and the oil to be treated. A satisfactory operation can be obtained by use of the blending means 32 which comprises merely a pipe T in which the streams join, and which discharges the resulting mixture into a pipe 33. If desired, a heater 34 may be disposed in this pipe to supply additional heat, or heat at this point may be used to the exclusion of heat applied to the incoming oil to be purified. The resulting or composite mixture then continues its movement along the pipe 33 for delivery to an electric treater 35.

Various electric treaters can be used in the process. In the embodiment shown, the pipe 33 discharges upward into a tank 36 of this treater. Suspended therein by insulators 37 are upper and lower electrodes 38 and 39 which may be formed of a plurality of concentric hoops or rings 40 mounted on a suitable support 41. Disposed therebetween and suspended from insulators 42 are upper and lower intermediate electrodes 43 and 44 cooperating respectively with the upper and lower electrodes 38 and 39 in defining upper and lower treating spaces 45 and 46. Energization of the electrodes is effected by a suitable source of potential, for example transformers 52 and 53 having secondary windings connected in additive relation with a common grounded connection 54 and respectively connected to the electrodes, as shown. The primary windings of these transformers are connected to a common source. By suitable connection, the voltage effective in establishing a field in the treating spaces 45 and 46 will be double the voltage produced by either transformer, yet the potential between any single electrode and the grounded tank will be equal to the voltage produced by either transformer alone. Auxiliary fields will be established between the upper end of the tank 36 and the electrode 38, as well as between the electrode 39 and a body of water 57 which is placed in, or accumulates in, the lower end of the tank 36.

It is usually preferable to introduce the resulting mixture directly into an electric field shortly after it has been produced. The drawing shows the pipe 33 as communicating with a suitable distributor 56 discharging this resulting mixture radially into the lower treating space 46 where coalescence takes place. The coalesced masses move downward in the tank 36 toward the lower end thereof while the oil moves upward. The treating space 45 is available for further treatment of the material which moves upward thereinto.

Clean oil from which a major portion of the impurities has been removed can be withdrawn through a pipe 59 from the upper end of the tank 36. Water, resulting from coalescence of the droplets, accumulates in the lower end of the tank to form or renew the body of water 57, and can be withdrawn through a pipe 60. Valves 61 and 62 are indicative of means for controlling the relative amounts of water and oil withdrawn and controlling the pressure in the treater 35.

It is not essential to the invention to use a portion of the incoming oil as the carrier liquid. Other carrier liquids predominantly miscible with the oil can be used. For example, the valve 19 can be closed and the pump 20 rendered inoperative to permit withdrawal of a carrier liquid from a container 70 through valve 71, pipe 72, pump 73, and valve 74 to the pipe 25. The aqueous medium will then be introduced into the carrier liquid moving through the pipe 25 in quantity determined by the relative settings of valves 26 and 74, or the relative speeds of the pumps 22 and 73. Some mixture of the carrier liquid and the aqueous medium will result when the streams are joined in the pipe 25 and such additional mixing action as may be desired can be effected through use of the mixing means 30, after which the auxiliary mixture thus formed is blended with the incoming oil moving through the pipes 13 and 16.

In other instances, various economies and better operation can be obtained by using a portion of the purified oil as the carrier liquid. For example, the pump 73 may withdraw a portion of this purified oil from the pipe 59 through a pipe 77 and a valve 78. In this instance, the carrier liquid moving through the pipe 72 may comprise a fractional portion of the purified oil discharged from the treater 35, or it may comprise a mixture of material withdrawn simultaneously from the tank 70 and the pipe 59 by proper control of valves 71 and 78. In either instance, the aqueous medium will be added thereto and the auxiliary mixture formed before blending with the oil to be purified.

In general, it will be found that the process works best if the following considerations are kept in mind:

The auxiliary mixture which is formed by use of the carrier liquid and the aqueous medium is one in which the aqueous content is greater than that of the incoming oil to be purified, or the desired resulting or composite mixture delivered to the electric treater. The particle size of the aqueous medium dispersed in the auxiliary mixture should correspond approximately to the desired particle size in the resulting or composite mixture. A particle size is selected which will form a resulting mixture readily resolvable by an electric field, followed by settling, into a purified oil and a relatively oil-free water. Such mixing may be used as will give a heterogeneous particle size in the auxiliary mixture and this has been found desirable in most instances, though a relatively uniform particle size can also be used. In most instances, it is found desirable to disperse the aqueous medium in droplets of an average size larger than the original droplets in the incoming oil, particularly if this oil to be treated contains extremely small water droplets.

The mixing action utilized in forming the auxiliary mixture is preferably not sufficiently intense, or of such character, as to cause predominant mixing of the aqueous material with any original droplets of water which may be present in the carrier liquid. Such mixing is preferably used as will disperse the aqueous material in the carrier liquid to coexist with most of the original droplets of water if present in this carrier liquid as, for example, if a fractional portion of the incoming oil is used as the carrier liquid or if this carrier liquid comprises, in whole or in part, clean oil withdrawn from the upper end of the treater. However, this factor is not extremely critical and it is not objectionable if some such coalescence takes place during formation of the auxiliary mixture.

It is desirable that the auxiliary mixture contain a very considerable number of dispersed aqueous droplets and this, in part, determines the amount of aqueous medium mixed with the carrier liquid. It is preferable to avoid such large percentages of aqueous medium with respect to the carrier liquid as might result in the formation of an aqueous-continuous mixture. Best results are obtained if the auxiliary mixture is of such character that the continuous portion comprises the carrier liquid in which the aqueous medium is dispersed. However, in some instances, it is possible to add up to from 50% to 70% of the aqeous medium to the carrier liquid without forming such reverse-type mixtures. The amount of aqueous medium added to the carrier liquid may vary over wide limits but from 10% to 60% will represent the ordinary range.

The amount of carrier liquid used, relative to the amount of incoming oil, is not critical. Usually, the amount of carrier liquid is considerably less by volume than the incoming oil but the carrier liquid can be used in amount even greater than the oil to be treated without departing from the spirit of the invention. Very satisfactory results have been obtained by using relatively small amounts of the carrier liquid, with resulting economies in pumping and mixing costs.

The blending together of the auxiliary mixture and the oil to be treated is an important part of the present invention. This blending can be accomplished by batch or continuous methods as can also the formation of the auxiliary mixture. When the auxiliary mixture is brought into blending relationship with the oil to be treated, it is not essential to use any violent mixing action. The invention contemplates the desirability of rather gentle mixing limited in intensity to that sufficient to cause uniform blending of the carrier liquid with the oil. A desirable resulting mixture formed by this blending is one in which the original water droplets of the incoming oil coexist with the droplets of the aqueous medium present in the auxiliary mixture. It has been found that high percentages of the impurities can be removed if the original droplets predominantly coexist with droplets of the aqueous medium when subjected to the action of the electric field. The field exerts a powerful coalescing action on these coexisting droplets and causes the original impurity-containing droplets to become associated with the droplets of the aqueous medium. The resulting coalesced masses then carry downward therewith the impurities associated with any of the original droplets which have been coalesced. It will thus be found that the water bleed of the treater 35 will contain in large measure the impurities associated with the original water droplets of the incoming oil. By use of the invention, extractions averaging about 90% can be obtained. In some instances, more than 95% of the impurities can be removed from the incoming oil by the expedients described herein.

The separated oil withdrawn from the top of the treater 35 will be found to contain only a very few of the original water droplets present in the incoming oil which have not been coalesced. It will also contain some droplets of the aqueous medium which have not been coalesced. It is usually found that these droplets will be of very small size, e. g., not over about 3 mu if the aqueous content of the treated oil is below about 3%.

The process may have some slight net dehydrating effect if the incoming oil contains more than about 3% of water. Usually, however, the process is so operated as to produce a cleaned oil having a water content within 1% or 2% of the water content of the incoming oil but, from the standpoint of increased impurity extraction, I prefer to reduce the water content of the treated oil to a value below 3% and, preferably, below 1%. However, with incoming oils which contain only a fraction of 1% of dispersed water, the process will sometimes produce a cleaned oil containing more water than was present in the incoming oil, but I prefer to limit the water content of the treated oil, even in this instance, to less than 3% unless subsequent steps are relied upon to remove more of the remaining water before discharge of the purified oil into the subsequent cracking or distillation equipment.

In some instances, it has been found that treatability and clean separation are bettered if the aqueous medium is alkaline and the present invention contemplates the incorporation into the carrier liquid of aqueous alkaline droplets in certain instances.

Temperature conditions are not critical in the present process though, in most instances, the resulting mixture is more susceptible of electric treatment if at elevated temperature. Temperatures from 100° F. up to the boiling point of water at the existing pressure may be used, but the preferred range is usually between 120° F. and 180° F. It is never desirable to increase the temperature to such an extent that the water will vaporize. The desired elevated temperature of the resulting mixture can be obtained by heating the mixture, the incoming oil, the carrier liquid, or the aqueous medium. If desired, heat may be applied to the constituents forming the resulting mixture, both before and after this mixture is formed.

Pressure conditions in various portions of the system can also be varied considerably without departing from the spirit of the invention. The pressure in the treater 35 can be atmospheric but it is preferred to maintain a somewhat higher pressure therein, for example, pressures from 15 to 50 lbs./sq. in. Such a pressure can be maintained by proper regulation of the valves 61 and 62 with respect to the pressure of the pump 10. The pressures used in forming the auxiliary mixture will vary with different oils, and the pumps 20, 22, and 73 can develop the desired pressure to force the carrier liquid and the aqueous medium through the mixing means 30. The pressure differential across this mixing means will determine in large measure the particle size of the resulting mixture. With some carrier liquids, the pressure differential need be only a few pounds per square inch or, in some instances, the mixing device 30 may be eliminated if the desired resulting mixture is formed by other expedients, for example, by controlled injection of the aqueous medium into the carrier liquid. In other instances, the pressure differential across the mixing means 30 may be as high as 50 or 100 lbs./sq. in. Preliminary tests with any particular oil will disclose the best operating pressure differential at this point.

The electrical potentials applied in the treater can be varied over wide limits without departing from the spirit of the invention. Alternating current fields are preferred but any field which is of sufficient intensity to effect the desired coalescence can be utilized. Using the transformer connection shown, very satisfactory operation has been obtained by developing a potential of 12,000 volts across each transformer so that the potential across the main treating spaces 45 and 46 will be 24,000 volts.

The present invention is a distinct advance in the art in many respects. I have found that it gives superior results as compared to a system in which water is directly emulsified with the total quantity of incoming oil to be treated. For example, in desalting a certain oil containing .7% water and containing 146.5 grams of salt per barrel, direct mixing of this oil with 10% of its volume of water produced a purified oil containing .1% water and 5.4 grams of salt per barrel. This same oil, when treated by the present invention, by mixing with a portion thereof an equal quantity of water to form an auxiliary mixture which was then blended into the incoming oil in a ratio of one part of the auxiliary mixture to four parts of the oil produced a purified oil containing approximately .1% water and 5.0 grams of salt per barrel. Identical temperature conditions were used and a centrifuge test of the resulting mixture of the test made in accordance with the present invention showed 9% of water. With other oils, even greater superiority is shown in the ultimate results produced by the present invention.

In addition, the present invention makes possible better control of the mixing or emulsifying action. For example, an auxiliary mixture of the desired particle size can be made and the dispersed particles may then be incorporated into the oil to be treated with gentle mixing and without coalescing any large number of the original droplets with the droplets of the aqueous medium. The present invention makes it possible to mix the aqueous medium with a small volume of the carrier liquid, such as by mixing with a fractional flow of the incoming oil. It is much easier to make small volumes of such a mixture than large volumes, and the process can be more readily controlled.

Further, the present invention results in savings in operating expenses. Small mixing devices can be used and the higher-pressure pump 20 can be small. The larger volume of oil can be handled through the lower-pressure pump 10 and through the low-pressure heater 12. Savings in cost and power are thus effected.

Finally, the present process is extremely flexible in permitting use of various carrier liquids mixed in various ways to form the auxiliary mixture. A wide range of oils can be treated to remove impurities therefrom, and, by proper selection of the carrier liquid, the process makes treatable and separable from the aqueous material oils which would otherwise be difficult or impossible to purify by an electric process. For example, certain dehydrated crude oils and certain topped oils are known which have a density closely approximating that of water. The gravity differential between the incoming oil and the aqueous medium can be increased in accordance with the present invention by use of a carrier liquid of such character as to dilute the oil and reduce its density, thus making the difference in density between the oil and aqueous medium of the resulting mixture sufficiently large to make continuous gravitational separation of the electrically treated constituents possible in a suitable settling zone.

Various changes and modifications can be made without departing from the spirit of the invention as defined in the appended claims.

I claim as my invention:

1. A process for removing water-associated impurities from an oil containing original water droplets dispersed therein, which process includes the steps of: blending into said oil an auxiliary mixture comprising a carrier liquid predominantly miscible with said oil and carrying dispersed droplets of an aqueous medium which is relatively more free of the impurities than are the original water droplets, thus forming a resulting mixture containing coexisting droplets of the original water and the aqueous medium; subjecting this resulting mixture to the action of an electric field to coalesce in large measure said coexisting droplets; and separating the coalesced masses.

2. A process for removing water-associated impurities from an oil containing original water droplets dispersed therein, which process includes the steps of: continuously blending streams of said oil and an auxiliary mixture comprising a carrier liquid predominantly miscible with said oil and carrying dispersed droplets of an aqueous medium which is relatively more free of the impurities than are the original water droplets, thus forming a resulting mixture containing coexisting droplets of the original water and the aqueous medium; continuously introducing a stream of said resulting mixture into an electric field to coalesce in large measure the coexisting droplets; and separating the coalesced masses.

3. A process for removing water-associated impurities from an oil containing original water droplets dispersed therein, which process includes the steps of: forming an auxiliary mixture by mixing together a carrier liquid predominantly miscible with said oil and an aqueous medium which is relatively more free of said impurities than are the original water droplets, the auxiliary mixture containing a larger percentage of said aqueous medium than is desired in the resulting mixture; bringing together said auxiliary mixture and the oil to be treated in such manner as to disperse the droplets of aqueous medium in said oil to coexist with the droplets of the original water thus forming a resulting mixture; discharging a stream of the resulting mixture continuously into an electric field to coalesce in large measure the coexisting droplets; and separating the coalesced masses.

4. A process for removing water-associated impurities from an oil containing original water droplets dispersed therein, which process includes the steps of: continuously mixing streams of a carrier liquid predominantly miscible with the oil and an aqueous medium which is relatively more free of said impurities than are said original water droplets to form a stream of an auxiliary mixture in which aqueous droplets are suspended in said carrier liquid; continuously bringing together this stream and a stream of said oil to form a stream of a resulting mixture in which said aqueous droplets coexist with said original water droplets; continuously introducing the stream of said resulting mixture into an electric field to coalesce the coexisting droplets; and separating the coalesced masses.

5. A process for removing water-associated impurities from an oil containing original water droplets dispersed therein, which process includes the steps of: mixing a carrier liquid miscible with said oil and containing water dispersed therein in percentage not more than the percentage of the original water droplets in said oil with an aqueous medium which is relatively more free of said impurities than are said original water droplets to form an auxiliary mixture containing substantially more dispersed aqueous material than is present in said oil and which is desired in the resulting mixture; blending this auxiliary mixture with the oil to be treated in such manner as to disperse the droplets of aqueous medium in said oil to coexist with said original water droplets; subjecting this resulting mixture to the action of an electric field to coalesce in large measure said coexisting droplets; and separating the coalesced masses.

6. A process as defined in claim 5 in which said carrier liquid comprises a portion of the oil remaining after separation of said coalesced masses from the electrically treated constituents of said resulting mixture.

7. A process for removing water-associated impurities from an oil containing original water droplets dispersed therein, which process includes the steps of: mixing with a portion of the oil to be treated an aqueous medium relatively more free of said impurities than the water of said original droplets to form an auxiliary mixture in which droplets of said aqueous medium are suspended in said portion of said oil; blending this auxiliary mixture into a remaining portion of said oil to form a resulting mixture in which the droplets of aqueous medium coexist with droplets of the original water; subjecting this resulting mixture to the action of an electric field to coalesce in large measure said coexisting droplets; and separating the coalesced masses.

8. A process for removing water-associated impurities from an oil containing original water droplets dispersed therein, which process includes the steps of: dividing a stream of said oil to be treated into main and auxiliary streams; mixing with said auxiliary stream an aqueous medium which is relatively more free of said impurities than is the water of said original droplets to form an auxiliary mixture containing dispersed aqueous droplets; then bringing together said main and auxiliary streams to form a resulting mixture in which droplets of said aqueous medium coexist with droplets of the original water; subjecting this resulting mixture to the action of an electric field to coalesce in large measure said coexisting droplets; and separating the coalesced masses.

9. A process as defined in claim 1 in which said aqueous medium comprises fresh water.

10. In combination in a system for removing water-associated impurities from an oil containing original water droplets dispersed therein: a mixing means; means for delivering streams of an aqueous medium and a carrier liquid to said mixing means to form an auxiliary mixture, said carrier liquid being miscible with the oil to be treated; a blending means; means for delivering a stream of the auxiliary mixture to said blending means; means for delivering a stream of the oil to be treated to said blending means whereby the streams delivered to this means are blended to form a resulting mixture; means for establishing an electric field; and means for delivering a stream of said resulting mixture to said electric field.

11. In combination in a system for removing water-associated impurities from an oil containing original water droplets dispersed therein: means for mixing a portion of the oil to be treated with an aqueous medium to form an auxiliary mixture; means for blending said auxiliary mixture with another portion of the oil to be treated to produce a resulting mixture containing dispersed droplets of said aqueous medium coexisting with said original water droplets; and means for electrically treating said resulting mixture to coalesce the coexisting droplets therein.

12. In combination in a system for removing water-associated impurities from an oil containing original water droplets dispersed therein: means for forming a flowing stream of the oil to be treated; means for dividing said flowing stream into a main stream and an auxiliary stream; means for mixing an aqueous medium with said auxiliary stream to form an auxiliary mixture; means for returning said auxiliary mixture to said main stream to produce a resulting mixture containing dispersed droplets of said aqueous medium coexisting with said original water droplets; and means for electrically treating said resulting mixture to coalesce the coexisting droplets therein.

13. A process for purifying oils electrically by dispersing therein to coexist with the impurities droplets of an aqueous medium which is relatively free of the impurities to be removed and capable of becoming associated with said impurities under the action of an electric field and resolving the dispersion with the aid of an electric field to produce a purified oil containing a small amount of dispersed water, which process includes the steps of: forming the dispersion to be treated by withdrawing a portion of said purified oil and mixing same with said aqueous medium to form an oil-continuous dispersion, and blending a proportioned amount of this oil-continuous dispersion with the oil to be purified whereby the aqueous droplets in said dispersion are dispersed throughout the oil to be purified to coexist with the impurities therein to form the dispersion which is to be subjected to the action of said electric field.

14. A process for purifying an impurity-containing oil of low water content by use of an aqueous medium which is relatively free of the impurities to be removed, said oil and said aqueous medium being so close in density as to make separation difficult, which process includes the steps of: dispersing said aqueous medium in a carrier liquid which is miscible with said oil and which is of such nature as to increase the gravity differential between said oil and said aqueous medium when blended with said oil;

bringing together the oil to be purified and this dispersion of aqueous medium in said carrier liquid to form a resulting dispersion in which droplets of the aqueous medium coexist with impurities; and resolving said resulting dispersion to separate therefrom an amount of aqueous medium substantially corresponding to the amount added in the process to leave a body of oil having a low water content commensurate with that of the oil to be purified, said resolving comprising the step of subjecting said resulting dispersion to the action of a coalescing electric field to coalesce the droplets of the dispersed aqueous medium and associate the impurities therewith.

15. In combination in a system for purifying an oil: walls defining an enclosed space; two conduits communicating with said enclosed space; means for flowing through said conduits under pressure proportioned liquid streams; means for forcing into one of said conduits at a point ahead of said enclosed space a proportioned stream of another liquid to mix with said stream flowing in this conduit before reaching said enclosed space; means for establishing an electric field; and means communicating with said enclosed space for delivering to said electric field a stream of composite material.

GORDON B. HANSON.

CERTIFICATE OF CORRECTION.

Patent No. 2,313,939.  March 16, 1943.

GORDON B. HANSON.

It is hereby certified that error appears in the printed specification of the above numbered patent requiring correction as follows: Page 1, second column, line 20, for "exist" read --coexist--; page 5, first column, line 19, for "connection" read --connections--; and that the said Letters Patent should be read with this correction therein that the same may conform to the record of the case in the Patent Office.

Signed and sealed this 4th day of May, A. D. 1943.

(Seal)

Henry Van Arsdale,
Acting Commissioner of Patents.